(12) United States Patent
Horak et al.

(10) Patent No.: US 7,597,489 B2
(45) Date of Patent: Oct. 6, 2009

(54) APPARATUS AND METHOD FOR PROVIDING POINTING CAPABILITY FOR A FIXED CAMERA

(75) Inventors: Dan T. Horak, Ellicott City, MD (US); Emray R. Goossen, Albuquerque, NM (US); Steven D. Martinez, Corrales, NM (US)

(73) Assignee: Honeywell International Inc., Morristown, NJ (US)

( * ) Notice: Subject to any disclaimer, the term of this patent is extended or adjusted under 35 U.S.C. 154(b) by 539 days.

(21) Appl. No.: 11/402,450

(22) Filed: Apr. 12, 2006

(65) Prior Publication Data
US 2008/0185526 A1    Aug. 7, 2008

Related U.S. Application Data

(60) Provisional application No. 60/716,208, filed on Sep. 12, 2005.

(51) Int. Cl.
*G03B 19/12* (2006.01)

(52) U.S. Cl. .................. 396/358; 348/144; 348/146; 250/347; 250/353; 359/862

(58) Field of Classification Search .............. 396/358; 348/144, 146, 148; 250/347, 353; 359/862
See application file for complete search history.

(56) References Cited

U.S. PATENT DOCUMENTS

| | | | | |
|---|---|---|---|---|
| 5,715,003 | A | 2/1998 | Kanno ........................ 348/341 |
| 6,390,692 | B1 | 5/2002 | Booth ........................ 396/358 |
| 6,658,207 | B1 * | 12/2003 | Partynski et al. ............... 396/7 |
| 6,920,234 | B1 * | 7/2005 | Koenig et al. ................ 382/103 |
| 7,136,726 | B2 * | 11/2006 | Greenfeld et al. .............. 701/3 |
| 2002/0043949 | A1 | 4/2002 | Christinson et al. ......... 318/560 |
| 2002/0180759 | A1 | 12/2002 | Park et al. .................... 345/629 |
| 2003/0198364 | A1 * | 10/2003 | Yonover et al. ............. 382/103 |
| 2005/0029458 | A1 * | 2/2005 | Geng et al. .................. 250/347 |

FOREIGN PATENT DOCUMENTS

WO    2004/066614 A1    5/2004

OTHER PUBLICATIONS http://www.bai.aero/payloads.html#series66.
International Search Report for PCT/US2006/035147 mailed Apr. 19, 2007.
"Series 66 Minature" [Online] Nov. 14, 2005, XP002416997. Retrieved from the Internet: URL:http://www.bai.aero/pdf/series66-LowRes.pdf> cited in the application.

* cited by examiner

*Primary Examiner*—W. B. Perkey
*Assistant Examiner*—Warren K Fenwick
(74) *Attorney, Agent, or Firm*—McDonnell Boehnen Hulbert & Berghoff LLP (57) ABSTRACT

Reflective movable mirrors are used to reflect an image from a desired direction into the lens of a camera. This apparatus is preferably used with infrared (IR) cameras. To capture images from different directions, the orientations of the mirrors are modified. The mirrors are light, requiring only miniature motors and actuators for moving them. The mirrors are also much smaller than the focal plane electronics and the IR lens, requiring much less space for moving them than would be required for moving the camera. This provides a pointing capability for an airframe-fixed IR camera and this capability is provided with minimum additional payload, space and power requirements. The apparatus and method can be used for IR and electro-optical (EO) cameras.

15 Claims, 9 Drawing Sheets

APPARATUS AND METHOD FOR PROVIDING POINTING CAPABILITY FOR A FIXED CAMERA

CROSS-REFERENCE TO RELATED APPLICATIONS

This application is based on U.S. Provisional Application Ser. No. 60/716,208 entitled "Apparatus and Method for Providing Pointing Capability for Fixed Camera", filed on Sep. 12, 2005, the teachings of which are incorporated herein by reference.

BACKGROUND OF THE INVENTION

1. Field of the Invention (Technical Field)

The present invention relates to cameras and more particularly to controlling the viewing direction such as pan and tilt angles, of a camera with extreme weight, size, and power restrictions.

2. Background Art

Figure 1:
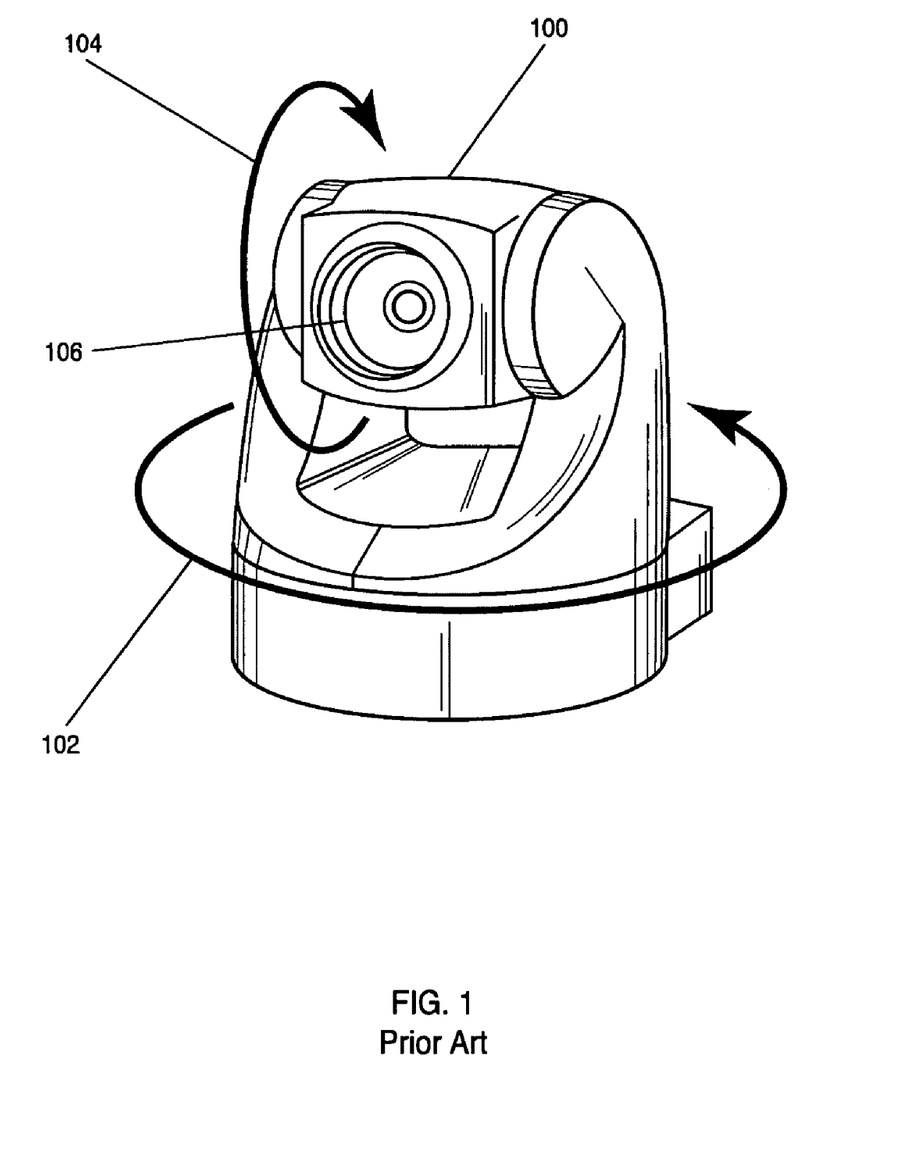
FIG. 1 shows the prior art method of pointing a camera with a conventional pan-tilt camera gimbal.

The present invention solves the problem where a pan-tilt mechanism must be extremely light and small, because it is intended for a very small unmanned air vehicle (UAV). It must also consume little electrical power to maximize battery life. Presently, pan-tilt units for cameras are known standard devices that one can purchase. However, these units are large, heavy and consume significant electrical power. Conventional pan-tilt units for cameras rotate the camera and its lens using motors and gears and aim it in the desired direction as shown in FIG. 1. Camera 100 is rotated in pan direction 102 by gears or other well known method and in tilt direction 104 in a similar fashion to point camera lens 106 towards the desired direction. An example of this type of device, intended for UAV applications, can be found in an advertisement for devices sold by L3 Communications BAI Aerosystems on their netsite: http://www.bai.aero/payloads.html#series66. A system is needed to accomplish the same functionality with a system that is small, light and consumes only a fraction of the power required for the prior art systems. Further, a similar system is needed for use of infrared (IR) cameras and their lenses which are larger and heavier than conventional visual light cameras, making the prior art systems prohibitive for IR camera use in small UAVs.

Various optical systems, such as scanners and laser range finders, use mirrors to deflect laser beams. In addition, single lens reflex (SLR) cameras use mirrors to deflect images.

SLR cameras have been around for decades as shown in U.S. Pat. Nos. 6,390,692 and 5,715,003. These cameras use a mirror that deflects the image (that already passed the lens) into the viewfinder. When a picture is taken, the mirror flips up and the image can reach the film that is in the back of the camera. This assures that the photographer sees in the viewfinder exactly what the film will see, even if he changes the lenses between shots. These two prior art patents deal with improving the mirror mechanisms for SLR cameras.

U.S. Pat. No. 6,678,395 teaches a method of scanning an area with a mirror. The patent deals primarily with algorithms and methods that process data from a multi-spectral camera so as to detect targets with unique spectral and spatial characteristics. They use a gimbaled mirror to scan areas that are not directly under the rescue aircraft. They describe this feature as 'the target area is scanned by a mirror oscillating about a scan axis across the flight path of the aircraft (cross-track)'. This prior art patent also discloses using the gimbaled mirror to deflect IR illumination at the area that is being captured by the camera. Yet another use of their gimbaled mirror is to stabilize the image by moving the mirror so as to offset aircraft vibrations. This device, in using a single mirror, cannot provide the coverage of the viewing area as the present invention. The present invention provides three hundred and sixty degree (360°) pan motion, preferably a plus or minus twenty-degree (±20°) tilt motion and capability to look down. The arrangement of mirrors and their rotations in the present invention meet all these specifications.

Another prior art patent is U.S. Pat. No. 6,396,233, which deals with a mirror-based gimbal for a target-tracking seeker for a missile. This is a device that is mounted in the nose of a missile and can point at targets that are not exactly along the longitudinal axis of symmetry of the missile. The scanning range of a seeker can be up to a ninety-degree (90°) cone, meaning that the seeker must be able to deflect plus or minus forty five-degrees (±45°) in all directions. Traditionally, in non-mirror-based designs, these motions are provided by two motors, one scanning left and right forty five-degrees (45°), and the other scanning up and down forty five-degrees (45°). This prior art patent replaces the two-motor design with a mirror suspended on a ball joint, which allows any angular rotation about the joint. This rotational freedom is controlled by four Kevlar lines pulled by computer-controlled capstans. For any angular position of the mirror, there is a set of lengths of the four lines that bring the mirror to that angular position. This prior art device suffers from the same deficiencies of the '395 patent in its limited viewing coverage.

The present invention is a method and apparatus that uses three light and small mirrors that can be rotated in such a way that they provide the desired viewing coverage and meet the weight and size constraints of a small UAV.

SUMMARY OF THE INVENTION

Disclosure of the Invention

Figure 9:
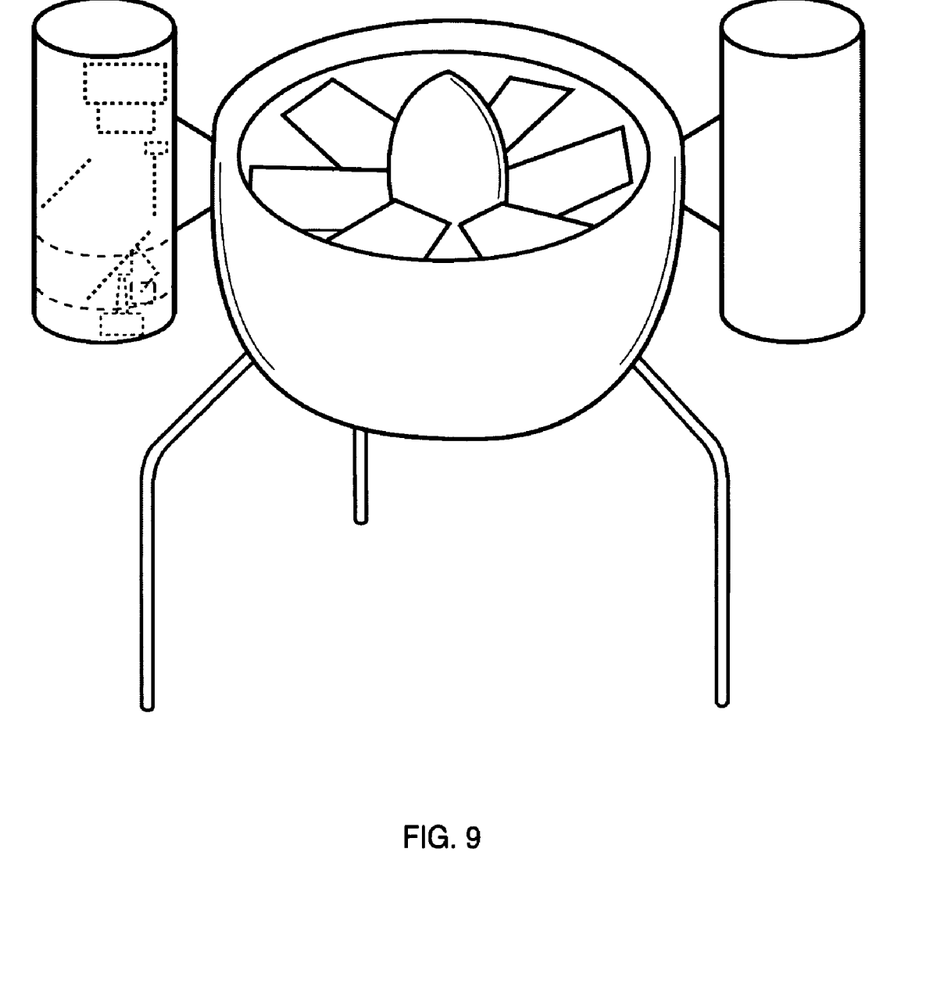
FIG. 9 shows the preferred embodiment of a MAV with a camera mounted in a pod.

The present invention is a method and apparatus for providing a viewing coverage area for a camera that is lightweight, small and that consumes a minimum amount of energy. This apparatus can be preferably used in UAVs such as a micro air vehicle (MAV) as shown in FIG. 9. This invention has a complete viewing coverage area of three hundred and sixty degree (360°) pan motion, and a tilt motion preferably of plus or minus twenty-degree (±20°), (i.e., looking above and below the horizon), and capability to look straight down. The tilt motion can be increased or decreased; however, this description describes only the preferred embodiment. This wide viewing coverage is an integral part of the invention. This is accomplished by moving mirrors to achieve the application-specific goal of providing camera pointing capability with minimum weight and size.

Surveillance tasks for MAVs can include target detection and imaging with electro-optical (EO) and IR cameras. There is a need to pan and tilt these cameras when the vehicle is flying so that it can look away from its direction of flight and capture images of stationary and moving ground targets and of side views. Additionally, forward motion and winds can tilt the MAV from a desired vertical orientation and disable the ability to examine a scene from the needed direction and angle if the cameras are fixed to the airframe.

Therefore, there is a need for mechanized pan and tilt motions for these cameras. However, an IR camera is relatively heavy and the physical dimension of its focal plane electronics and lens are quite large compared to the size of a vehicle as small as a MAV. Additionally, UAVs, such as the MAV, have limited payload capability and their compact design allows very limited space for mounting of surveillance cameras on them.

A primary object of the present invention is to provide pointing capability of a camera with minimum weight, size and power consumption.

Another object of the invention is to provide a camera pointing mechanism for use on a UAV.

A primary advantage of the present invention is its low weight, enabling its installation on a small UAV with limited payload capability.

Another advantage of the present invention is its small size, so that it will not significantly increase the size of the UAV and not interfere with its aerodynamics.

Yet another advantage is the low power consumption because high power consumption requires a large battery that adds to the UAV payload.

Another advantage of the present invention is that it can also be used in ground-based surveillance applications, and due to the small size of the invention, it improves the covertness of surveillance cameras, and low-power consumption extends battery life.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 2:
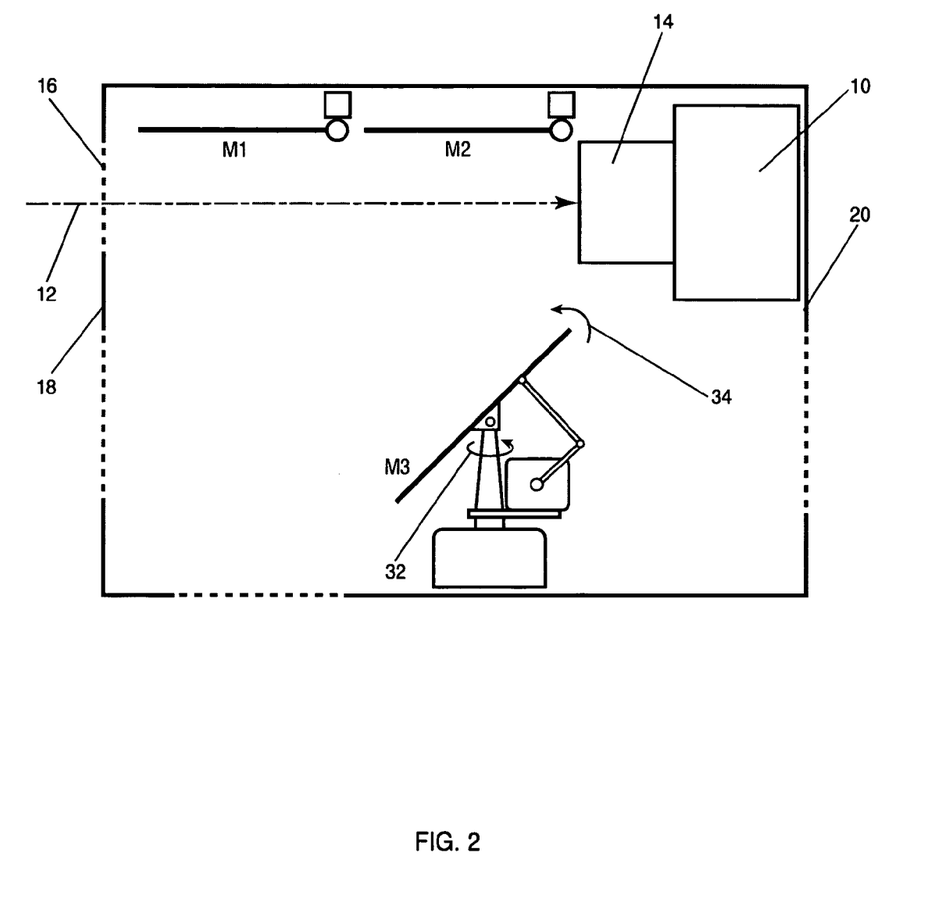
FIG. 2 shows a first embodiment for a forward-looking camera.
Figure 3:
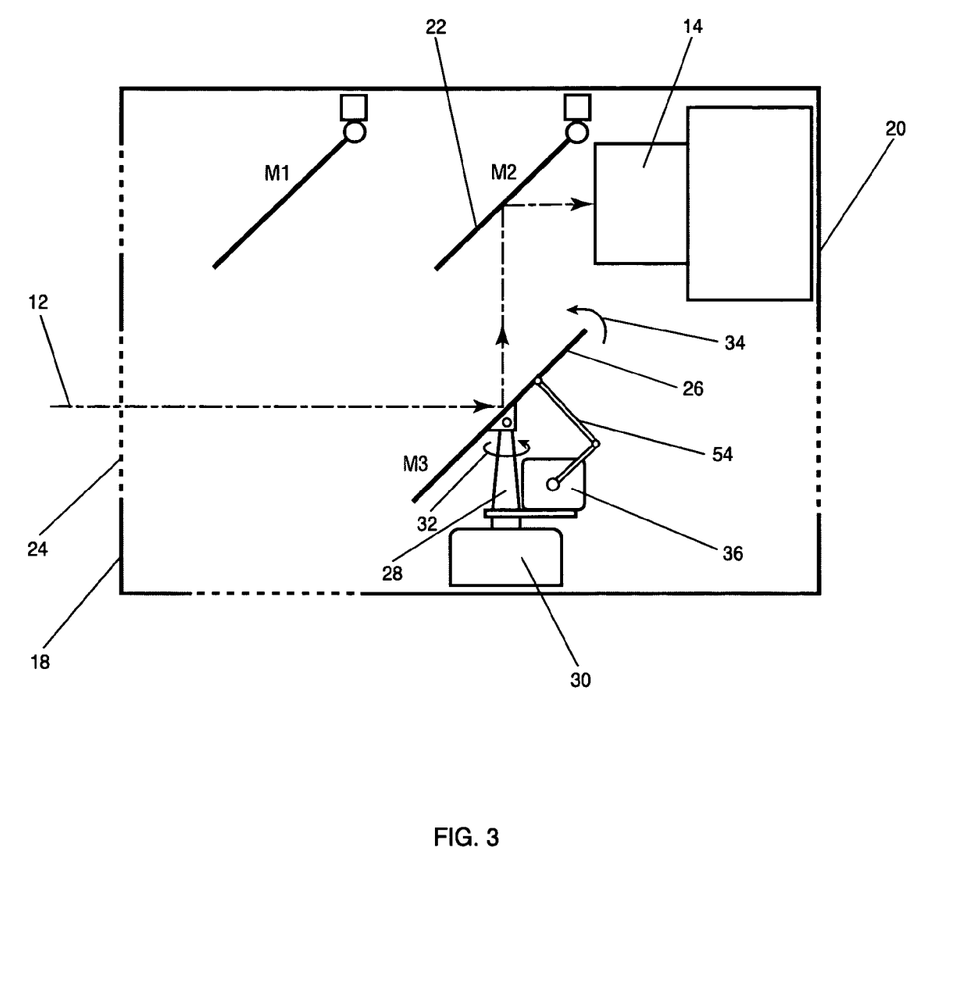
FIG. 3 shows the first embodiment for a pan tilt camera.
Figure 4:
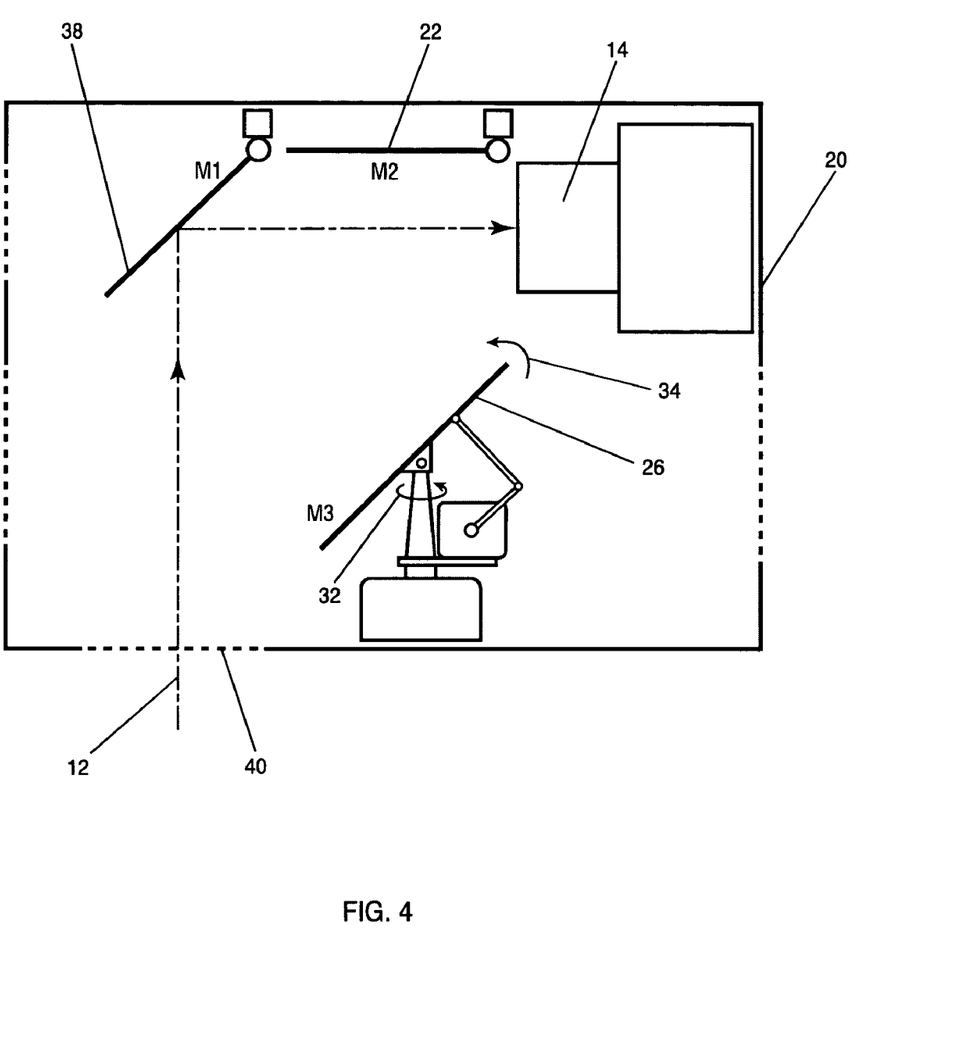
FIG. 4 shows the first embodiment for a down-looking camera.

The present invention is a method and apparatus for providing a camera viewing area for a camera mounted in a UAV such as a vertical take off and landing MAV. Four embodiments that illustrate the use of the present invention are described. Although the following descriptions are for IR cameras, the present invention can be used with all other types of cameras, thus this disclosure is not limited to IR cameras. The first embodiment is shown in FIGS. 2, 3, and 4. FIG. 2 shows an IR camera 10 mounted horizontally in a payload canister 20 that is attached to the MAV. Target image 12 enters camera lens 14 through a left upper IR-transparent window 16 on the left side 18 of canister 20. This is a mode of operation where camera 10 is in fixed forward-looking position and the image quality is optimal because image 12 is not reflected off mirrors. FIG. 3 shows a pan-tilt mode of operation of the first embodiment. IR reflective mirror M2 22 is tilted forty-five degrees (45°) down, as shown. Target image 12 now enters canister 20 through left lower window 24 on the left side 18 of canister 20 and is reflected off mirrors M3 26 and M2 22 into the camera lens 14. Mirror M3 26 is mounted on a turntable 28 that can be positioned by lower motor 30 to provide camera rotation about a vertical axis 32, i.e., camera pan. Note that the left lower IR-transparent window 24 on canister 20 is preferably along the entire circumference of canister 20 to allow three hundred and sixty degree (360°) 'camera pan' action. Mirror M3 26 can also be rotated about a horizontal axis 34 by means of second motor 36 that is mounted on turntable 28, and linkages 54. Although each of the embodiments show a motor driving a linkage assembly 54, other well known methods can be employed such as gears or belts, thus, this disclosure is not meant to limit the embodiments to any particular apparatus for accomplishing this purpose. This motion provides 'camera tilt' between about minus twenty degrees (−20°) and plus twenty degrees (+20°), allowing compensation for deviation of the MAV from vertical orientation. FIG. 4 shows mirror M1 38 tilted down forty-five degrees (45°), and mirrors M2 22 and M3 26 inactive. Image 12 enters canister 20 through bottom window 40 and is reflected off of mirror M1 38 into lens 14. This is a down-looking mode of operation. The pointing direction of the camera is determined by the angular positions of mirrors M1 38, M2 22 and M3 26. These positions are set by a microcontroller that translates a request to point the camera in a desired direction into the required angular positions of the mirrors. The microcontroller then moves the mirrors into these angular positions by controlling the mirror motors and actuators. To summarize, the first embodiment provides fixed forward-looking and fixed down-looking capability, as well as pan-tilt capability in planes that can preferably be up to about twenty degrees (20°) off horizontal.

Figure 5:
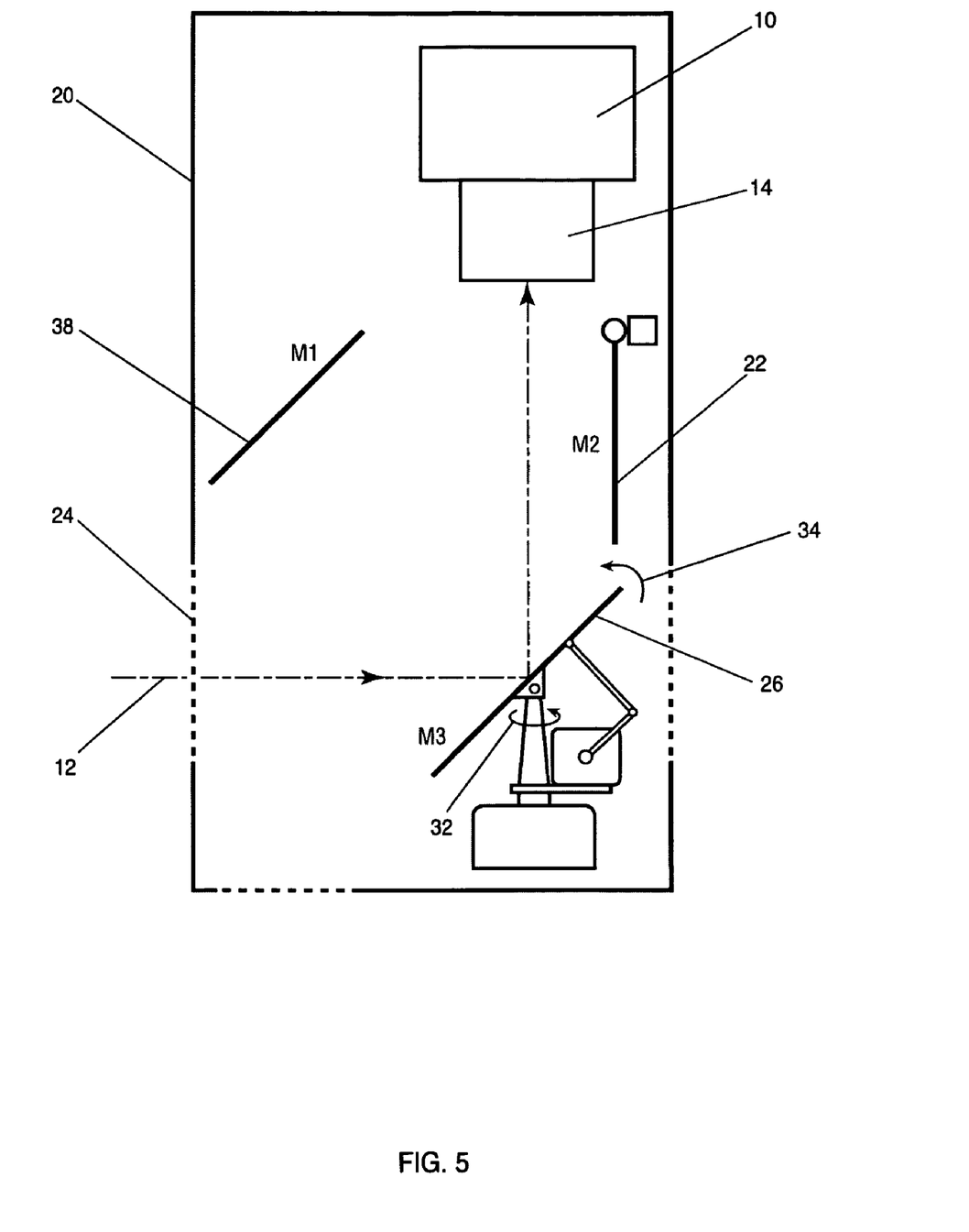
FIG. 5 shows a second embodiment for a pan tilt camera.
Figure 6:
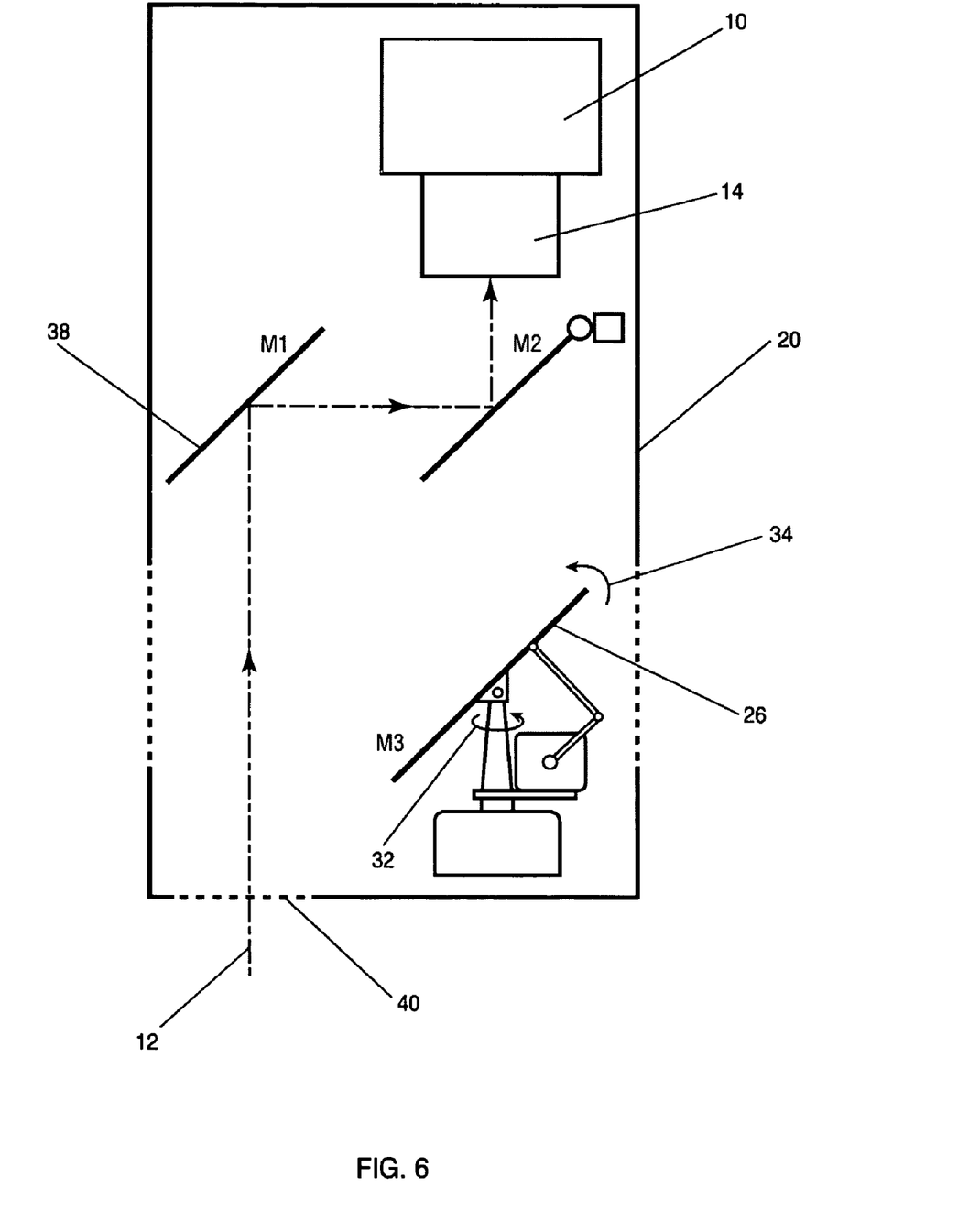
FIG. 6 shows the second embodiment for a down-looking camera.

The second embodiment of the invention is shown in FIGS. 5 and 6. FIG. 5 shows camera 10 mounted vertically in canister 20, and pointing down. Rotating mirror M3 26 provides three hundred and sixty degree (360°) 'camera pan' and 'camera tilt' of between about minus twenty degrees (−20°) degrees and plus twenty degrees (+20°), just like in the first embodiment. Image 12 enters through left lower window 24 and is reflected off of mirror M3 26 into camera lens 14. Mirrors M1 38 and M2 22 are inactive. FIG. 6 shows a mode of operation where mirror M2 22 is tilted up forty-five degrees (45°) and mirror M3 26 is inactive. Target image 12 travels through bottom window 40 and is reflected off fixed mirror M1 38 and mirror M2 22 into camera lens 14. This mode provides a down-looking camera.

The difference between the first embodiment and the second embodiment is that the first embodiment may provide better forward-looking image quality because it does not use mirrors in its forward-looking mode shown in FIG. 2. The second embodiment requires smaller horizontal dimensions and, therefore, may be easier to integrate into a MAV-sized vehicle.

Figure 7:
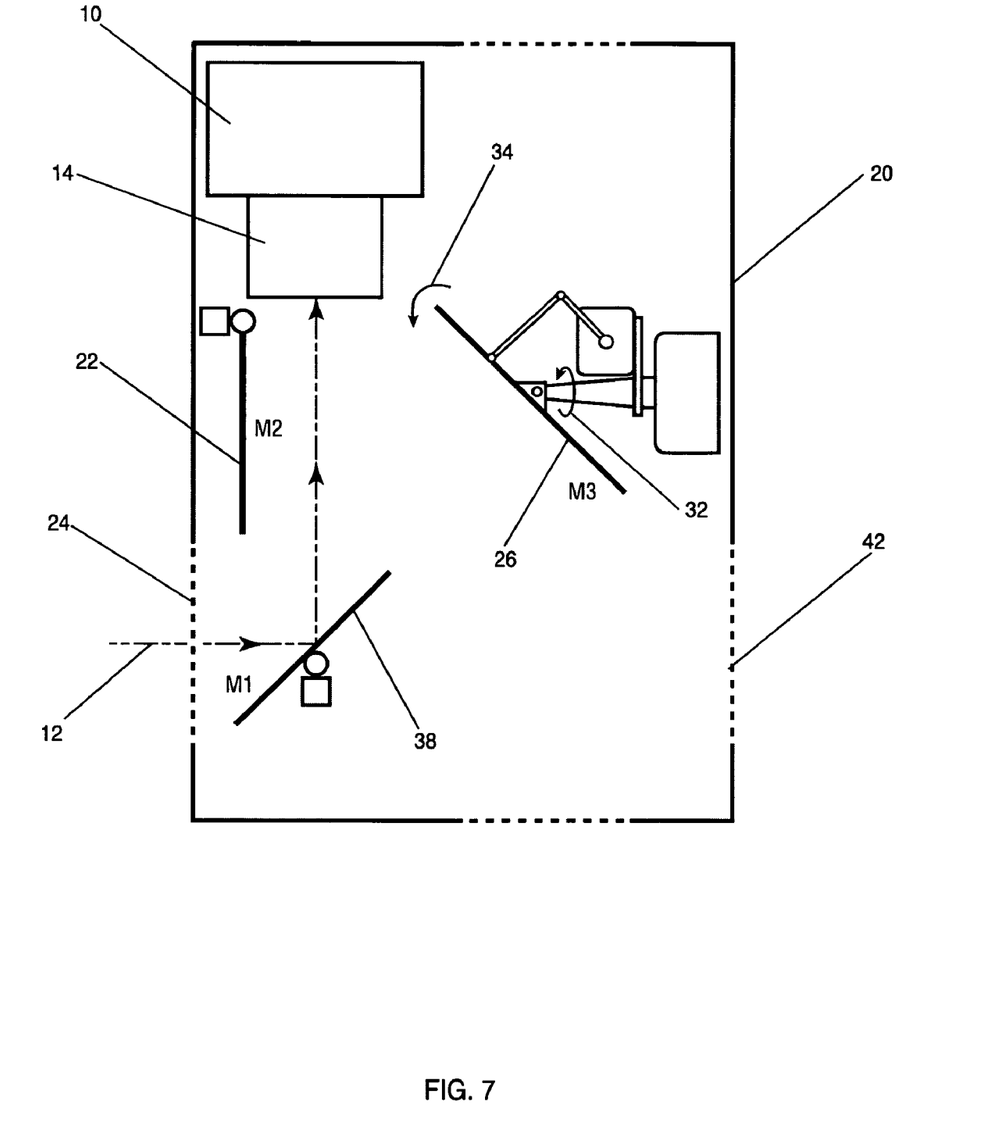
FIG. 7 shows a third embodiment for a forward-looking camera.

The third embodiment of the present invention is shown in FIG. 7. This embodiment is basically the first embodiment; however it is rotated ninety degrees (90°) counterclockwise, with mirror M1 38 mounted so that it can tilt forty-five degrees (45°) clockwise or forty-five degrees (45°) counterclockwise. FIG. 7 shows M1 38 tilted forty-five degrees (45°) counterclockwise, providing view to the left through left lower window 24. When mirror M1 38 is tilted forty-five degrees (45°) clockwise, it provides a view to the right through right lower window 42. When mirror M1 38 is inactive and mirrors M2 22 and M3 26 are positioned as in FIG. 3, the system provides a three hundred sixty degree (360°) tilt and pan between about minus twenty degrees (−20°) and plus twenty degrees (+20°). This would allow continuous pointing capability anywhere ahead of the MAV, under it, or behind it, and could be used to offset large MAV tilt angles required in fast forward flight.

In another alternative embodiment (not shown), a two (2) mirrored version can be utilized. However, this embodiment is not preferred because of its limitations and extrinsic parts. Mirror M1 is used to provide pan and tilt, like in the above described embodiments. However, one of the mirrors is eliminated and the looking-down function is achieved by sacrificing the ability to pan backwards (i.e., pan of one hundred eighty degrees (180°)). Instead, the panning range is limited to approximately minus one hundred sixty degrees (−160°) to plus one hundred sixty degrees (+160°). When a user wants to look down, the pan angle is set to one hundred eighty degrees (180°) (i.e., M1 pointing left), the tilt angle is set to zero degrees (0°), and mirror M2, mounted outside of the canister, is reflecting the image from under the canister into mirror M1, which is pointed to the left.

Figure 8:
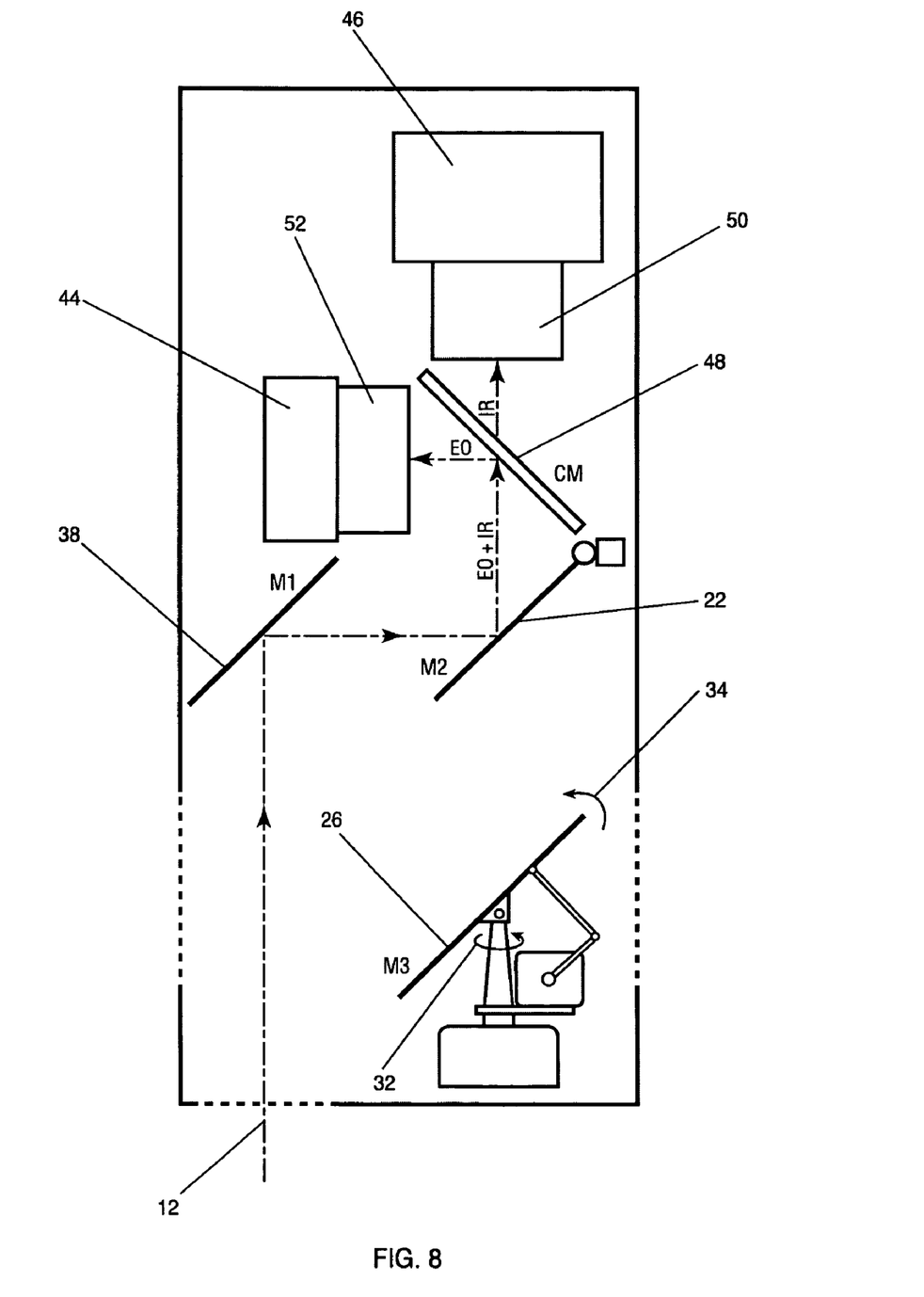
FIG. 8 shows a fourth embodiment for bore-sighted EO and IR cameras.

The forth embodiment of the present invention is shown in FIG. 8. In this embodiment, two boresighted cameras, one EO camera 44 and the other an IR camera 46, are recording image 12 simultaneously. The two boresighted camera embodiment can be incorporated into all the camera configurations shown in FIGS. 2-7. FIG. 8 shows the forth embodiment applied to the camera configuration shown in FIG. 6.

In FIG. 8, the single camera 10 shown in FIG. 6 has been replaced with an EO camera 44, an IR camera 46, and a commercially available optical device called a cold mirror 48. Cold mirror 48 is transparent at IR frequencies and it reflects light at visual (EO) frequencies. Therefore, when image 12 light reflected off mirror M2 22 reaches cold mirror 48, the image 12 light at IR frequencies passes through cold mirror 48 and reaches IR lens 50. Image 12 light at EO frequencies (i.e., visual light) is reflected by cold mirror 48 to the left, into EO lens 52 of EO camera 44. Thus, the two cameras record images of the same scene, but the IR camera records its IR image and the EO camera records its EO image. The two cameras are geometrically aligned (i.e., boresighted) so that image pixels of IR camera 46 correspond to image pixels of EO camera 44. In this embodiment, all the windows on the payload canister are made of material that is transparent to both IR and EO light. One such material is ALON, marketed by Surmet Corporation.

In using any of the embodiments as described above, the rotation of the mirror causes rotation of the image. When the pan mirror M3 26 is at its nominal forward-looking angular position, as shown in FIG. 5, the vertical dimension of the scene is projected on the vertical dimension of the camera image. If the camera has an aspect ratio (width/height) of 4:3, for example, then the smaller dimension of the camera image will correspond to the vertical dimension of the scene. This is the normal situation that camera users expect.

When the pan mirror rotates by 90 degrees from its nominal (forward-looking) angular position, the vertical dimension of the scene is projected on the horizontal dimension of the image, and vice versa. If the rotation is by an angle that is less than 90 degrees, the image is rotated by that angle. A bruteforce fix to this optical effect is to rotate the display screen by the camera pan angle, if the display screen is movable. Once rotated, vertical scene direction will correspond to vertical image direction, but the sides of the image rectangle shown on the display will not be along the horizontal and vertical directions of the scene.

A more reasonable way to handle the image rotation due to pan rotation is to rotate the image in software. Image-rotation algorithms are readily available and are built into many PC applications that handle images. Once the image is rotated in software to offset the mirror-caused rotation, vertical scene direction does correspond to vertical image direction, but the sides of the image rectangle are not along the horizontal and vertical directions of the scene on the display.

To avoid the problem of image rectangle orientation when software image rotation is used, one could limit the displayed image to a circle with a diameter equal to the vertical dimension of the image frame. Then the circle will always be oriented correctly and there will not be the effect of a rotating rectangle. However, some information will be lost because the circle is only 59% of the rectangular image. A user-option can be included for selecting between the circular display and the rotating rectangle display modes. The circular image is more aesthetically pleasing. The rectangular image shows a larger part of the scene.

Additionally, since mirrors are used in all of the embodiments, the camera will be recording mirror images of the scene. These mirror images will have to be corrected in software. Since an image processor will always be required to handle the cancellation of the mirror-image effect, it can also be used for the image rotation algorithm execution.

FIG. 9 shows the preferred embodiment of a MAV with the camera configuration of FIG. 5 mounted in a pod on the left. The other configurations as set forth above are similarly disposed within a pod.

The described embodiments provide the capability to control the viewing direction of a camera with minimum additional weight, size, and electrical power. This is especially important for very small UAV's.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. An apparatus for capturing images from a plurality of directions onto a lens of at least one fixed camera, the apparatus comprising:

a first moveable mirror, the first moveable mirror comprising a first structure for moving the first moveable mirror in a rotational horizontal axis and a second structure for moving the first moveable mirror in a vertical axis, for reflecting an image onto the lens;

a second moveable mirror having an active and inactive state, wherein, in the active state, the second moveable mirror reflects an image onto the lens; and a third moveable mirror having an active and inactive state, wherein, in the active state, the third moveable mirror reflects an image onto the lens.

2. The apparatus of claim 1 wherein said first structure comprises a pan motion of three hundred and sixty degrees.

3. The apparatus of claim 1 wherein said second structure comprises a tilt motion of a predetermined range.

4. The apparatus of claim 3 wherein the predetermined range comprises plus or minus twenty degrees.

5. The apparatus of claim 1 wherein the active states of the second and third moveable mirrors include a first mechanism for comprises a pan motion of three hundred and sixty degrees.

6. The apparatus of claim 1 wherein the fixed camera comprises an infrared camera and the apparatus further comprising a fixed electro-optical camera disposed at ninety degrees from the infrared camera wherein the first moveable mirror reflects the image onto a cold mirror, said cold mirror passing the infrared image to the infrared camera and reflecting the electro-optical image to the fixed electro-optical camera.

7. The apparatus of claim 1 wherein the first moveable mirror has an active and inactive state.

8. An apparatus for capturing images from a plurality of directions onto a lens of a fixed camera, the apparatus comprising:
- a rotating mirror comprising an independent vertical rotation and independent horizontal rotation;
- a first tilting mirror, wherein said first tilting mirror further comprises a first inactive mode;
- a second tilting mirror, wherein said second tilting mirror farther comprises a second inactive mode, and
- at least one actuator for positioning the rotating mirror, the first tilting mirror and the second tilting mirror to reflect an image located in a specific direction onto the lens.

9. The apparatus of claim 8 wherein said independent horizontal rotation comprises a pan motion of three hundred and sixty degrees.

10. The apparatus of claim 8 wherein said independent vertical rotation comprises a tilt motion of a predetermined range.

11. The apparatus of claim 10 wherein the range comprises plus or minus twenty degrees.

12. The apparatus of claim 8 wherein said first tilting mirror further comprises an active mode comprising a first structure for tilting said first tilting mirror forty five degrees from a first predetermined axis and said second tilting mirror further comprises an active mode comprising a second structure for tilting said second tilting mirror forty five degrees from a second predetermined axis.

13. An apparatus for simultaneously recording an infrared image and an electro-optical image of a same scene from a direction from a plurality of directions, the apparatus comprising:
- a fixed infrared camera and a fixed electro-optical camera, said fixed infrared camera disposed ninety degrees from said electro-optical camera;
- a first moveable mirror for reflecting an image for the scene onto a cold mirror, said cold mirror passing the infrared image to the fixed infrared camera and reflecting the electro-optical image to the fixed electro-optical camera;
- a second moveable mirror having an active and inactive state, wherein, in the active state, the second moveable mirror reflects an image onto the lens; and
- a third moveable mirror having an active and inactive state, wherein, in the active state, the third moveable mirror reflects an image onto the lens.

14. The apparatus of claim 13 wherein said fixed electro-optical camera and said fixed infrared camera are geometrically aligned.

15. The apparatus of claim 13 wherein the first moveable mirror has an active and inactive state.

* * * * *

UNITED STATES PATENT AND TRADEMARK OFFICE
CERTIFICATE OF CORRECTION

PATENT NO. : 7,597,489 B2 Page 1 of 1
APPLICATION NO. : 11/402450
DATED : October 6, 2009
INVENTOR(S) : Horak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-eighth Day of September, 2010

David J. Kappos
*Director of the United States Patent and Trademark Office*